US006177042B1

United States Patent
Fike

(10) Patent No.: US 6,177,042 B1
(45) Date of Patent: *Jan. 23, 2001

(54) METHOD AND APPARATUS FOR MAKING INTEGRAL RUBBER TRACTOR TRACKS

(75) Inventor: Louis T. Fike, Los Angeles, CA (US)

(73) Assignee: The Goodyear Tire & Rubber Company, Akron, OH (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/198,556

(22) Filed: Nov. 23, 1998

(51) Int. Cl.[7] .................................................. B29C 35/00
(52) U.S. Cl. .......................... 264/326; 264/334; 425/34.2; 425/384; 425/395; 156/137; 156/140; 156/141
(58) Field of Search ..................................... 264/236, 326, 264/347, 334, 315; 425/28.1, 34.2, 441, 394, 395, 407, 384; 156/137, 140, 141

(56) References Cited

U.S. PATENT DOCUMENTS

| | | |
|---|---|---|
| 1,579,922 | 4/1926 | Gammeter . |
| 1,665,870 | 4/1928 | Wetmore . |
| 1,715,973 | 6/1929 | Abbott . |
| 1,763,589 | 6/1930 | Kirk . |
| 1,779,376 | 10/1930 | Swern . |
| 1,779,377 | 10/1930 | Swern . |
| 1,949,443 | 3/1934 | Abbott . |
| 1,986,092 | 1/1935 | Abbott . |
| 2,747,225 | 5/1956 | Zona . |
| 3,222,716 | 12/1965 | Harris . |
| 3,791,897 * | 2/1974 | Mesly ..................................... 156/137 |
| 3,934,968 | 1/1976 | Cicognani . |
| 4,003,686 | 1/1977 | McLeod et al. . |
| 4,038,001 | 7/1977 | Stinnes . |
| 4,184,822 | 1/1980 | Schwabauer . |
| 4,510,113 | 4/1985 | Takano et al. . |
| 4,575,438 * | 3/1986 | Fike . |
| 4,589,941 * | 5/1986 | Tanaka et al. ........................ 156/140 |
| 5,104,600 * | 4/1992 | Remond . |
| 5,204,036 * | 4/1993 | MacMillan . |
| 5,207,849 * | 5/1993 | Siegenthaler . |
| 5,271,727 * | 12/1993 | Irie . |
| 5,346,663 * | 9/1994 | Siegenthaler . |
| 5,460,771 * | 10/1995 | Mitchell et al. . |
| 5,536,464 * | 7/1996 | Muramatsu ........................... 156/140 |

FOREIGN PATENT DOCUMENTS

| | | |
|---|---|---|
| 0 419 424 A2 | 8/1990 | (EP) . |
| 2 053 786 | 7/1979 | (GB) . |
| WO 91/04145 | 4/1991 | (WO) . |

\* cited by examiner

Primary Examiner—Mathieu D. Vargot
(74) Attorney, Agent, or Firm—Fulwider Patton Lee & Utecht, LLP

(57) ABSTRACT

Method and apparatus for molding an endless tractor track from an uncured belt and a plurality of drive lugs wherein the lugs are pressed onto the inner periphery of the belt, the belt and lugs are positioned in a mold to be cured and molded together while treads are formed on the outer periphery of the belt, and the completed belt is cooled and removed from the apparatus.

17 Claims, 14 Drawing Sheets

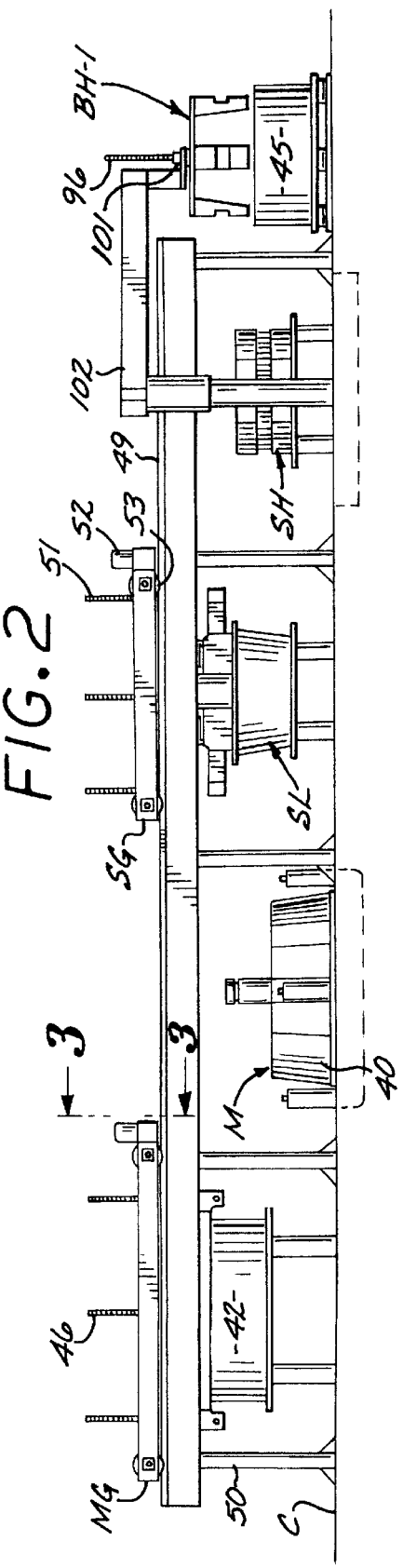
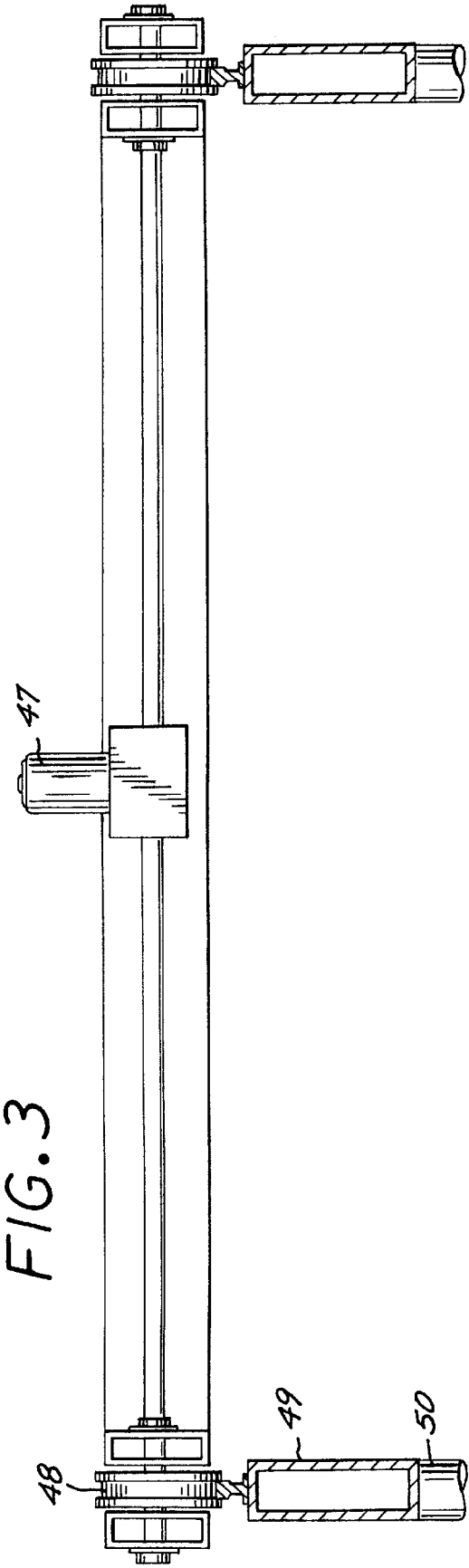

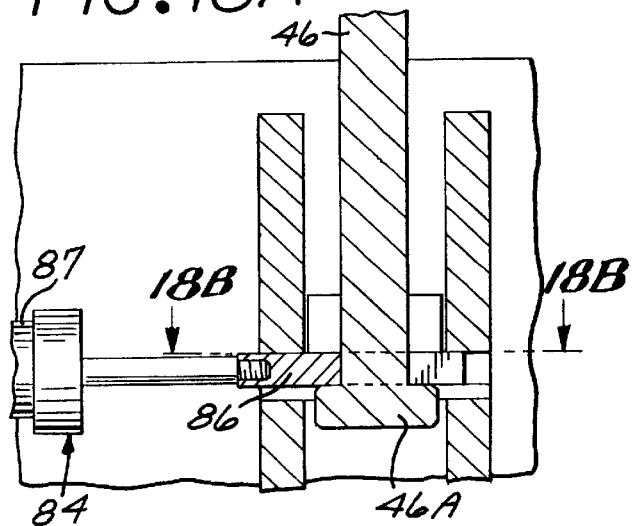
FIG. 18A
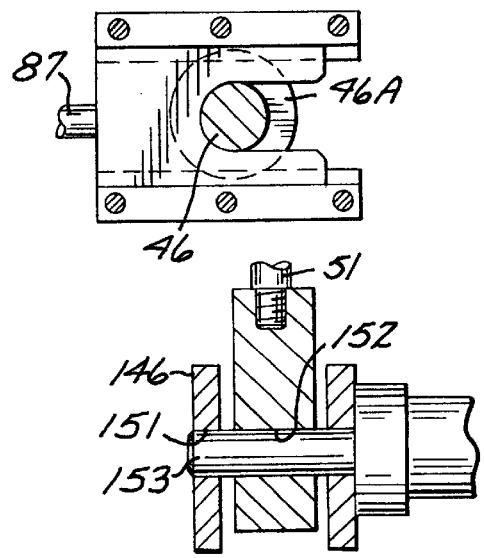
FIG. 18B
FIG. 18C
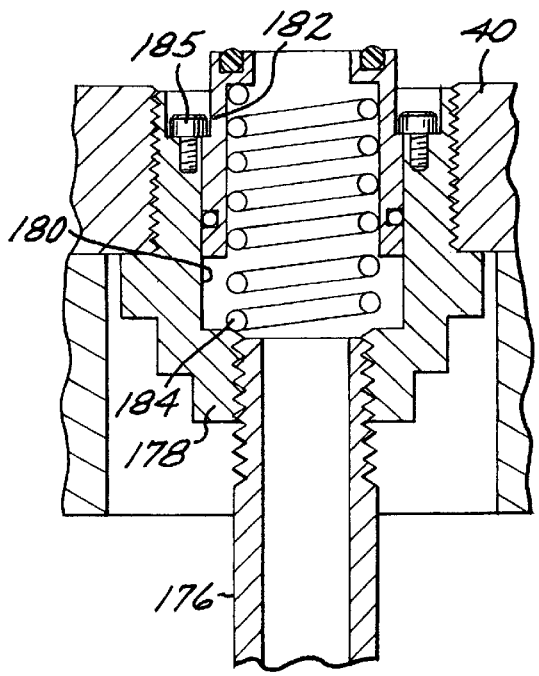
FIG. 19
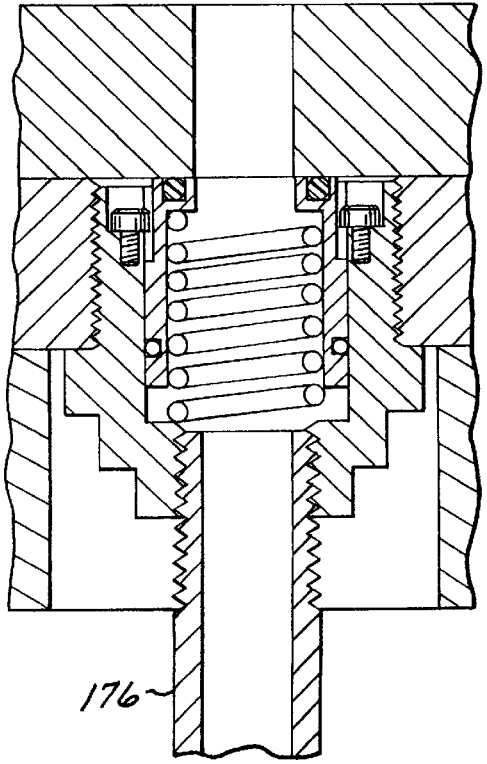
FIG. 20

METHOD AND APPARATUS FOR MAKING INTEGRAL RUBBER TRACTOR TRACKS

BACKGROUND OF THE INVENTION

1. Field of the Invention

The present invention relates generally to the molding of vehicle supporting elements formed of rubber and more particularly, to a system for molding rubber tractor tracks in an endless configuration.

2. Description of the Prior Art

Molded rubber tractor tracks are in many cases being substituted for conventional metal tractor tracks. Rubber tractor tracks offer better maneuverability, better ride quality in rough fields, better flotation in wet fields, improved side hill stability, excellent traction, low maintenance and versatility compared to steel tractor tracks. Additionally, rubber tracks are replacing conventional rubber tires on tractor and other agricultural vehicles such as combines, trenchers, snow removers, spreaders, sprayers, wagons and carts, since rubber tracks are more friendly to agricultural fields, offer better flotation and less compaction than rubber tires, resulting in better crop yield. The use of rubber tractor tracks permits farmers to get out into the fields earlier in the planting season and plant more crops as compared to rubber tire-equipped agricultural vehicles.

Rubber tractor tracks are defined by an endless rubber belt reinforced with continuous flexible steel cables bonded into the rubber. Presently, a complete rubber tractor track is molded flat in quarter sections which are sequentially then bonded together during the curing process. In practice, the joint between the bonded-together sections tend to break in use. Additionally, the joint between the bonded-together ends is of a different cross-sectional dimension than the cross-sectional dimension of the major portion of the track length. Accordingly, during movement of the track-supported vehicle, the vehicle is subject to severe vibrations. Such vibrations are not only harmful to the vehicle, but also to pavement over which the vehicle is moved. Additionally, such vibration is annoying to the vehicle operator.

Another method involves building a complete track using a drum. Uncured or cured lugs are first manually clamped within pockets formed in drum. Next, uncured rubber, calendered cord and wire cable are wrapped around the outside of the drum. Preformed uncured treads are then stitched onto the uncured rubber. The drum is then disposed within an autoclave to cure the rubber and the parts attached thereto. The drum is then collapsed to remove the completed track. Since only low pressure can be applied the cured rubber is of a low density with resulting low strength. Also, the track lugs and treads are not generally integrally bonded to the rubber and are displaced during use.

SUMMARY OF THE INVENTION

The method and apparatus for molding rubber tractor tracks of the present invention effects complete molding of an entire rubber track in an endless configuration of uniform thickness so as to eliminate any discontinuity in cross-section along the length of the rubber track. As a result, a rubber track embodying the present invention eliminates the vibration created by the bonded-together sections of a conventional rubber tractor track during vehicle movement. Additionally, a rubber tractor track embodying the present invention is not subject to breakage as in the case of a conventional rubber tractor track formed of bonded-together sections. Moreover, a rubber tractor track made in accordance with the present invention is completely integral with respect to the lugs and treads whereby the lugs and treads will not become separated from the track.

Another advantage of the method of molding rubber tire tracks embodying the present invention is the reduction in manufacturing time and cost afforded by such method, as compared to the prior art methods described above.

This advantage is broadly achieved by molding an initially uncured belt, securing drive lugs to the inner periphery of the uncured belt, inserting the uncured belt into a molding press, heating the molding press to mold treads on the outer portion of the belt while bonding the drive lugs to the inner portion of the belt, and then removing the cured belt and its drive lugs from the molding press.

The apparatus of the present invention includes a molding press having a plurality of horizontally movable outer molding segments formed with tread-defining recesses on their inner portions, a segment loader having a plurality of horizontally movable inner molding segments, each molding segment having a drive lug cavity that initially removably holds a drive lug, a belt handler for positioning an uncured belt within the confines of the inner molding segments of the segment loader, a power-operated segment loader to urge the inner molding segments outwardly to secure the drive lugs against the inner periphery of the uncured belts and a segment handler for moving the inner molding segments and uncured belt into the space encompassed by the outer molding segments of the molding press to effect curing of the belt between the inner and outer molding segments while forming the treads on the outer surface of the belt and bonding the drive lugs onto the inner portion of the belt, with the segment handler thereafter withdrawing the inner molding segments and cured belt from the molding press.

These and other features and advantages of the present invention will become apparent from the following detailed description of a preferred embodiment which, taken in conjunction with the accompanying drawings, illustrates by way of example the principles of the invention.

BRIEF DESCRIPTION OF THE DRAWINGS

FIG. 2 is a side elevational view of such apparatus;

FIG. 3 is a vertical sectional view taken in enlarged scale along line 3—3 of FIG. 2;

FIG. 18A is a vertical sectional view taken in enlarged scale along line 18A—18A of FIG. 4 showing a lifting rod connection device;

FIG. 18B is a horizontal sectional view taken along line 18B—18B of FIG. 18A;

FIG. 18C is a vertical sectional view taken along line 18C—18C of FIG. 7;

FIGS. 19 and 20 and are vertical sectional views taken in enlarged scale along line 20—20 of FIG. 8 showing a fluid connection fitting;

DETAILED DESCRIPTION OF THE PREFERRED EMBODIMENTS

Figure 21:
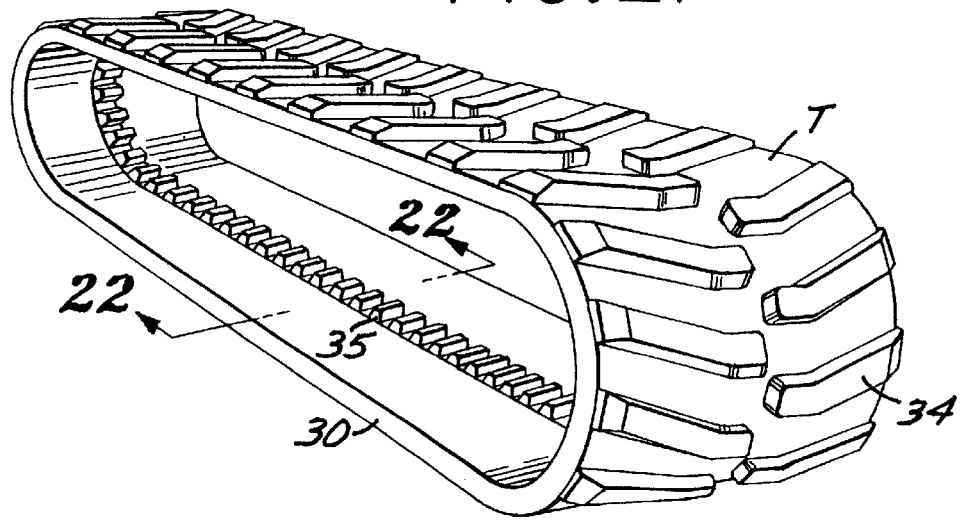
FIG. 21 is a perspective view showing a completed rubber tractor track made in accordance with the present invention.
Figure 22:
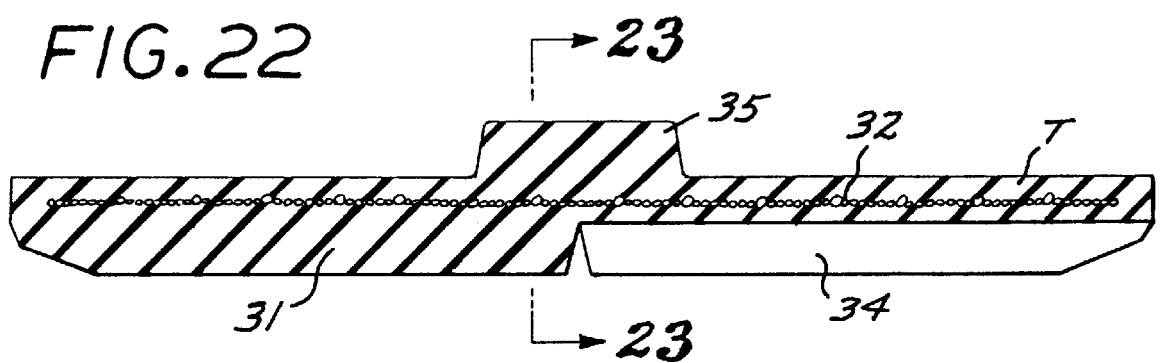
FIG. 22 is a vertical sectional view taken in enlarged scale along line 22—22 of FIG. 21.
Figure 23:
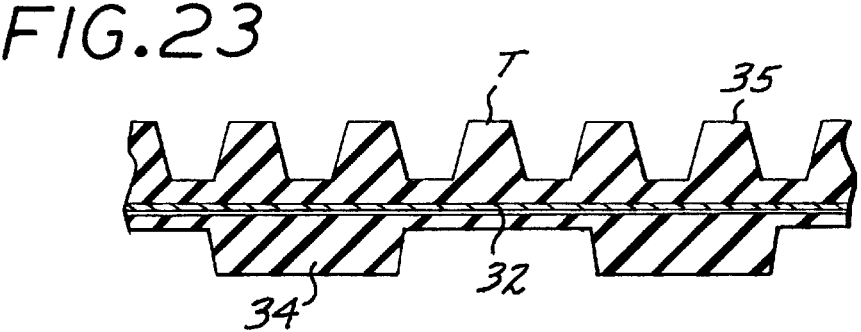
FIG. 23 is a vertical sectional view taken along line 23—23 of FIG. 22.

Referring to the drawings, in FIGS. 21, 22 and 23, there is shown a completed a rubber track T made in accordance with the method and apparatus of the present invention. Such track T comprises an endless band 30 formed of rubber 31 and calendered cord and wire cable 32 embedded in band 30. Such track T is adapted to be positioned upon the wheels and rollers of a motorized vehicle (not shown), such as a tractor or the like to support such vehicle for movement along a desired surface, such as an agricultural field. The exterior surface of band 30 is formed with integral treads 34. The mid portion of the interior periphery of band 30 is formed with a plurality of drive lugs 35 which engage complimentary sprockets (not shown) on the wheels or rollers of the vehicle which is supported by track T.

Figure 1:
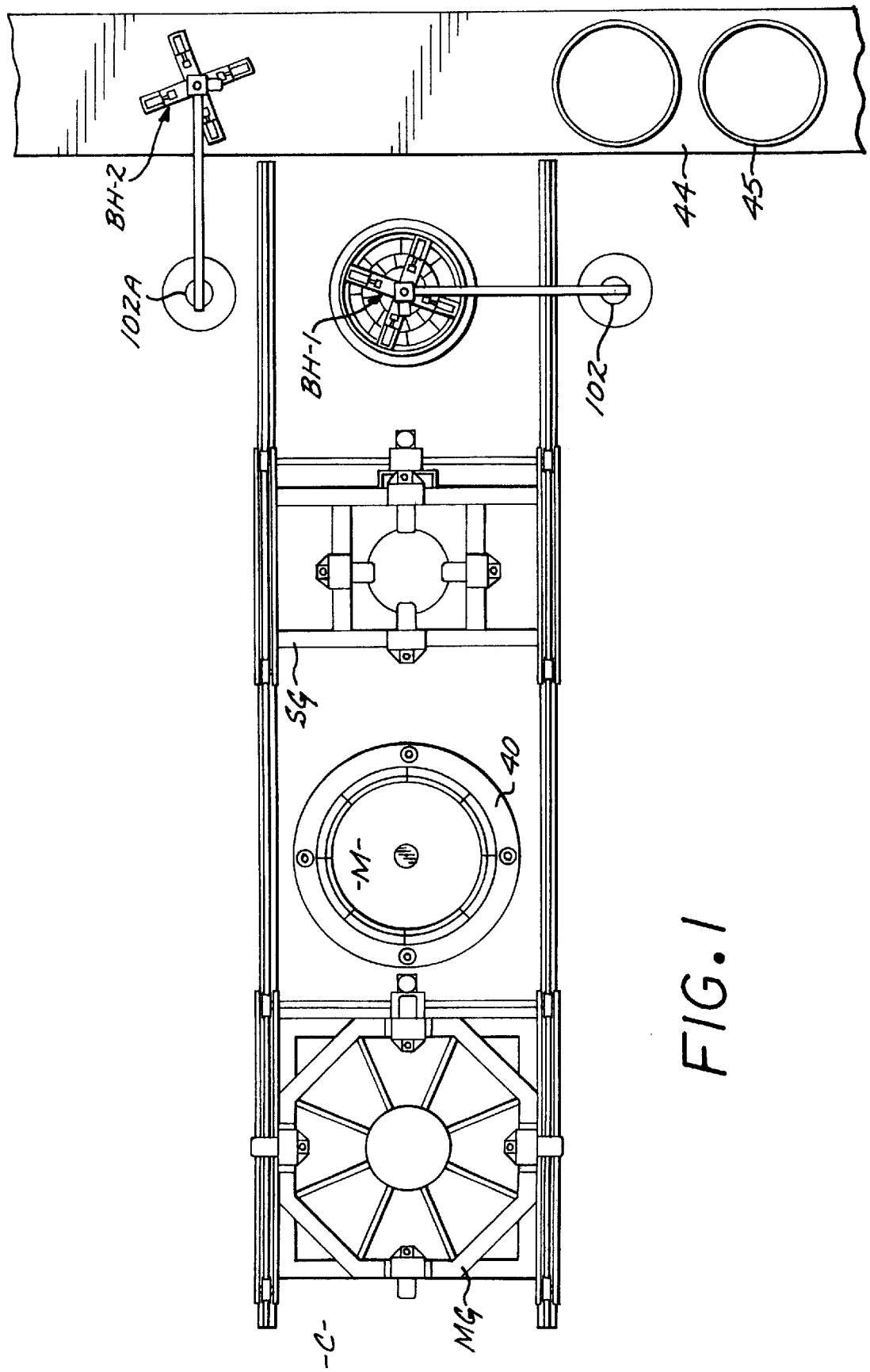
FIG. 1 is a top plan view of a preferred form of apparatus embodying the present invention.
Figure 5:
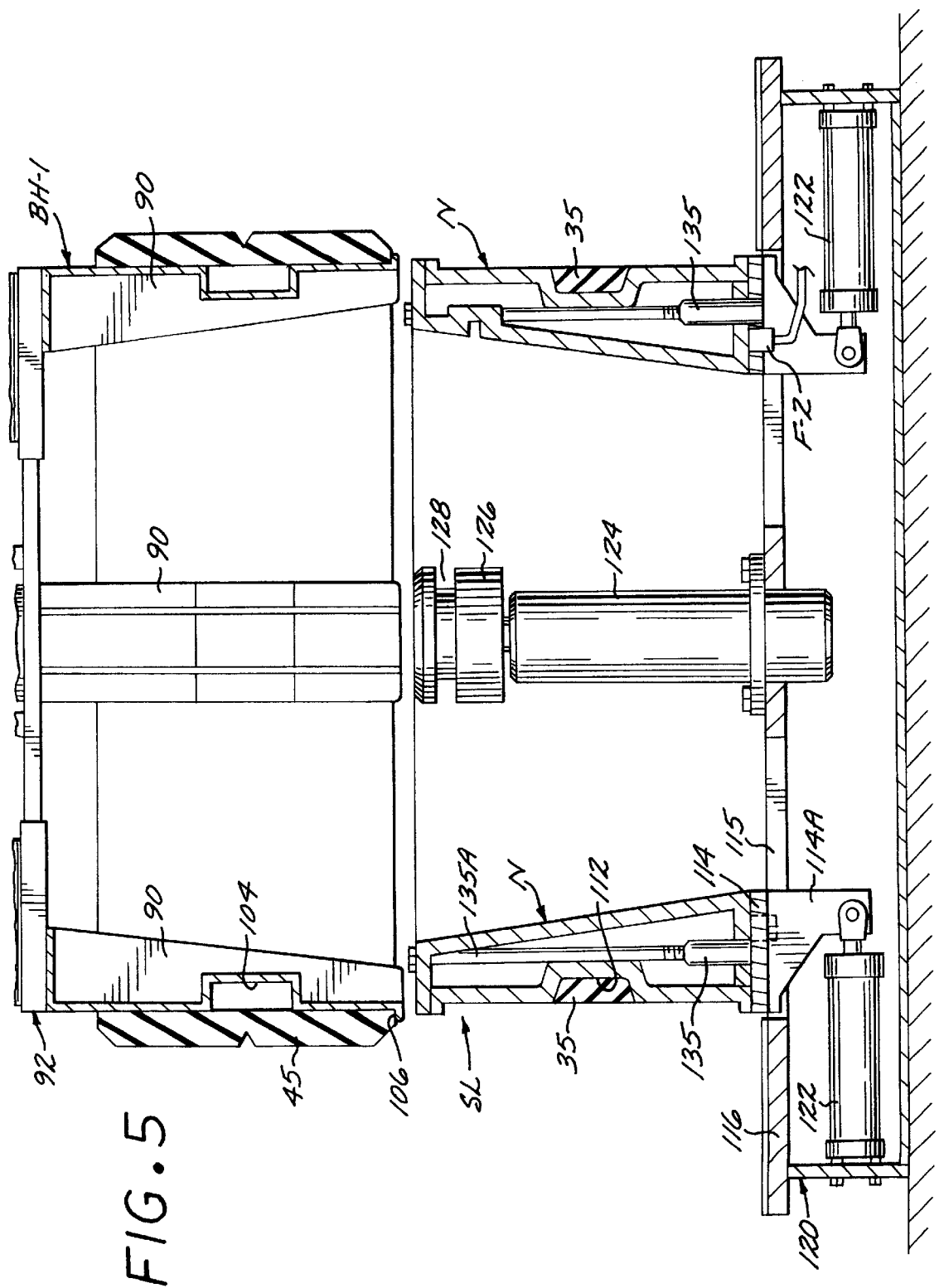
FIG. 5 is a cross-sectional side view showing a belt handler positioned above a segment loader forming part of said apparatus.
Figure 6:
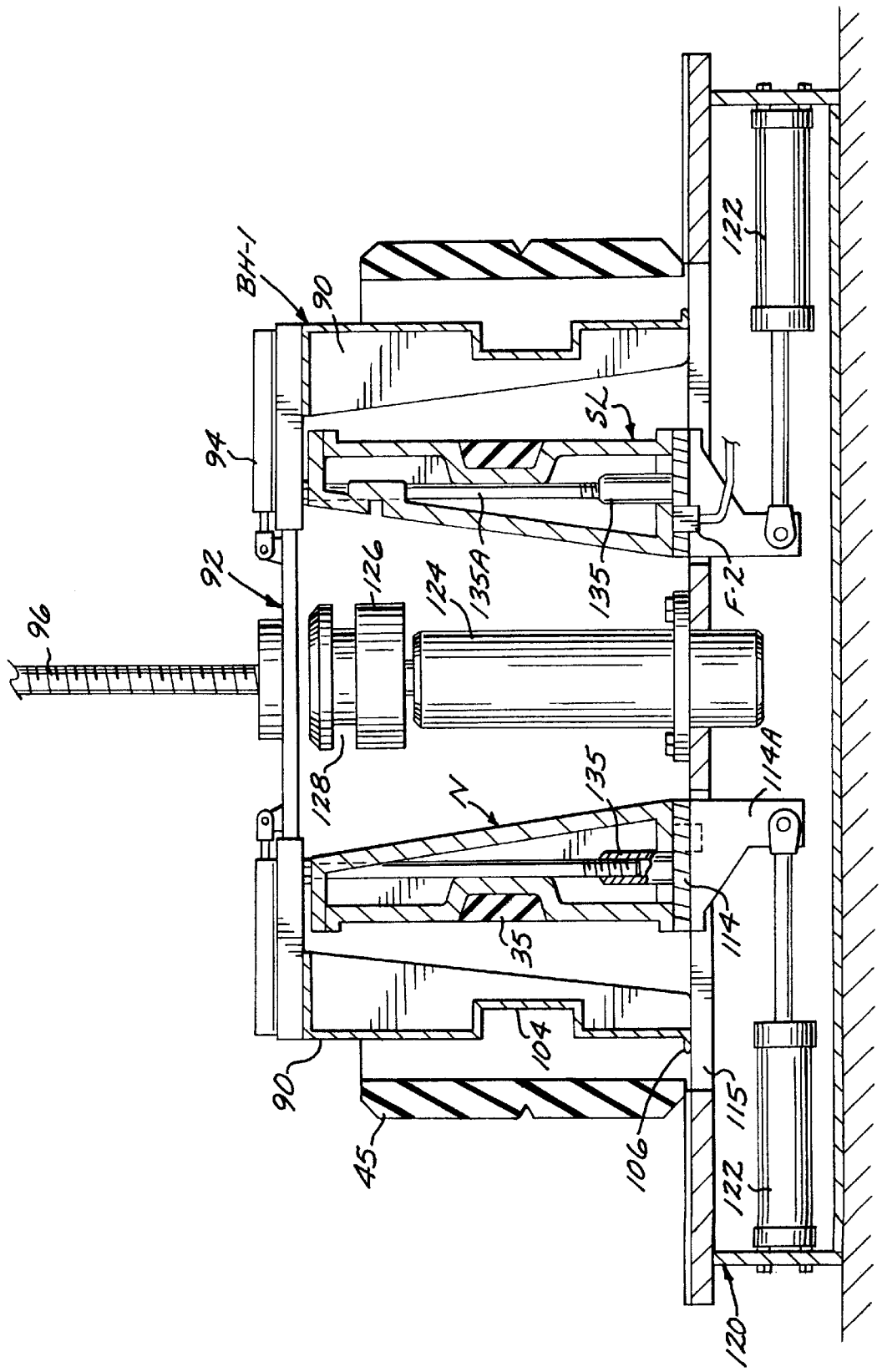
FIG. 6 is a view similar to FIG. 5 showing the belt handler lowered to encompass the segment loader.
Figure 7:
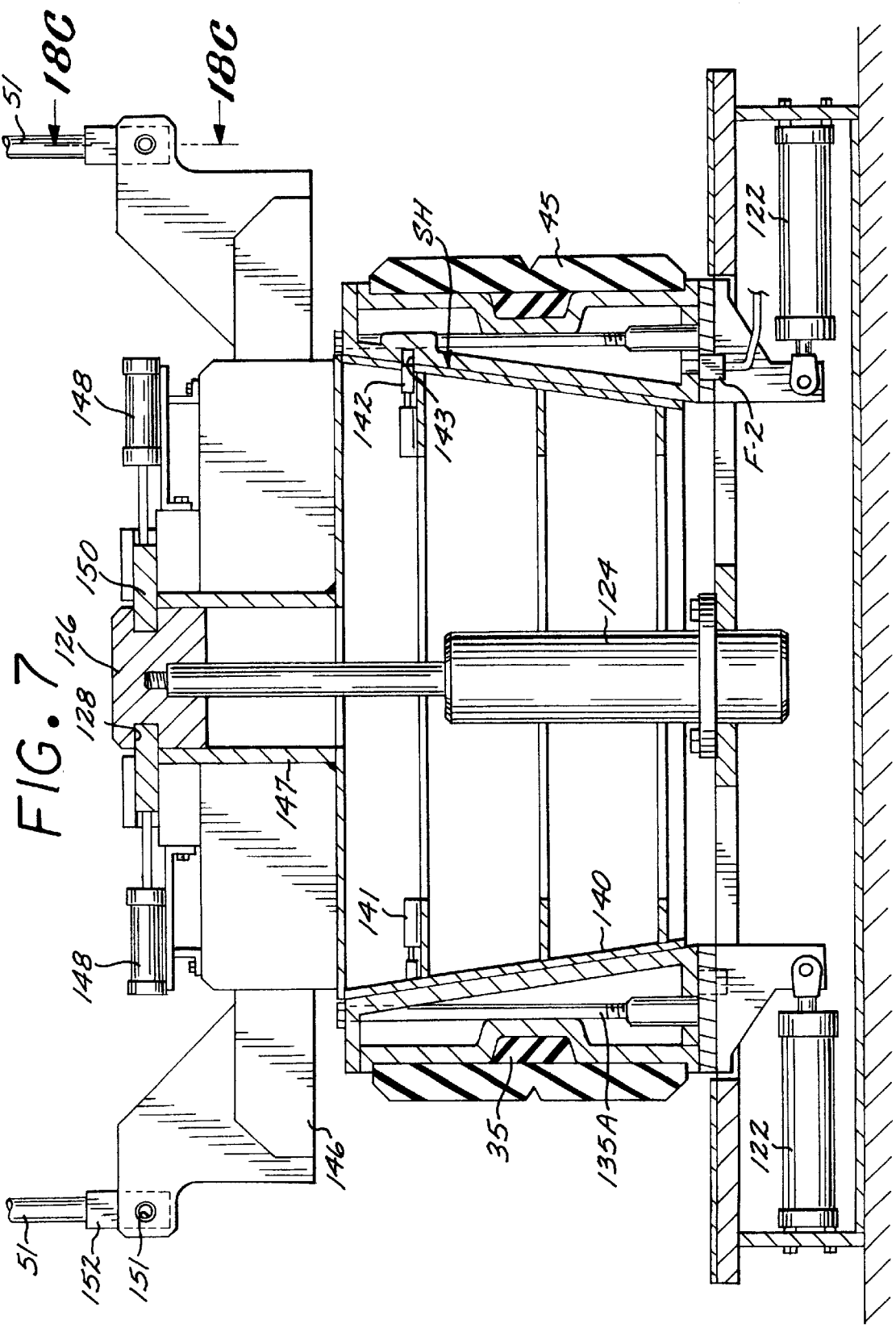
FIG. 7 is a cross-sectional side view showing a segment handler disposed within the segment loader.

Track T of FIGS. 21, 22 and 23 is formed by the apparatus shown in FIGS. 1 through 20. Referring to FIGS. 1, 2 and 3, such apparatus is supported upon a concrete floor C and includes a molding press gantry MG and a segment gantry SG both horizontally movable along the floor C. The major components of the track forming apparatus embodying the present invention includes a molding press M (FIGS. 4 and 8–10) having a lower platen, generally designated 40, and a mold top member, generally designated 42, a pair of belt handlers BH-1 and BH-2, a segment handler SH (FIG. 6), and a segment loader SL (FIGS. 6 and 7). The molding press gantry MG effects vertical and horizontal movement of the molding press top member 42 relative to the molding press lower platen 40. The segment gantry SG effects vertical and horizonal movement of the segment handler SH relative to the molding press M and segment loader SL. Belt handler BH-1 is swung from a first position over a conveyor belt 44 to a second position aligned with segment loader SL so as to move uncured belts 45 from the conveyor belt into segment loader SL. Belt handler BH-2 is swung from a position over segment loader SL to a position over the conveyor belt 44 to transfer a cured track T onto the conveyor belt.

More particularly, as shown in FIGS. 1 and 2 molding press gantry MG is of conventional construction having crossbars which support four, vertical, like, equidistantly spaced electric motor driven-lifting screw rods 46. Another electric motor 47 drives rollers 48 which ride on rails 49 secured to columns 50. Segment gantry SG is similar in construction to molding press gantry MG and includes four, vertical, like, electric motor-driven lifting screw rods 51. Electric motor 52 drive rollers 53 that ride on rails 49.

Figure 8:
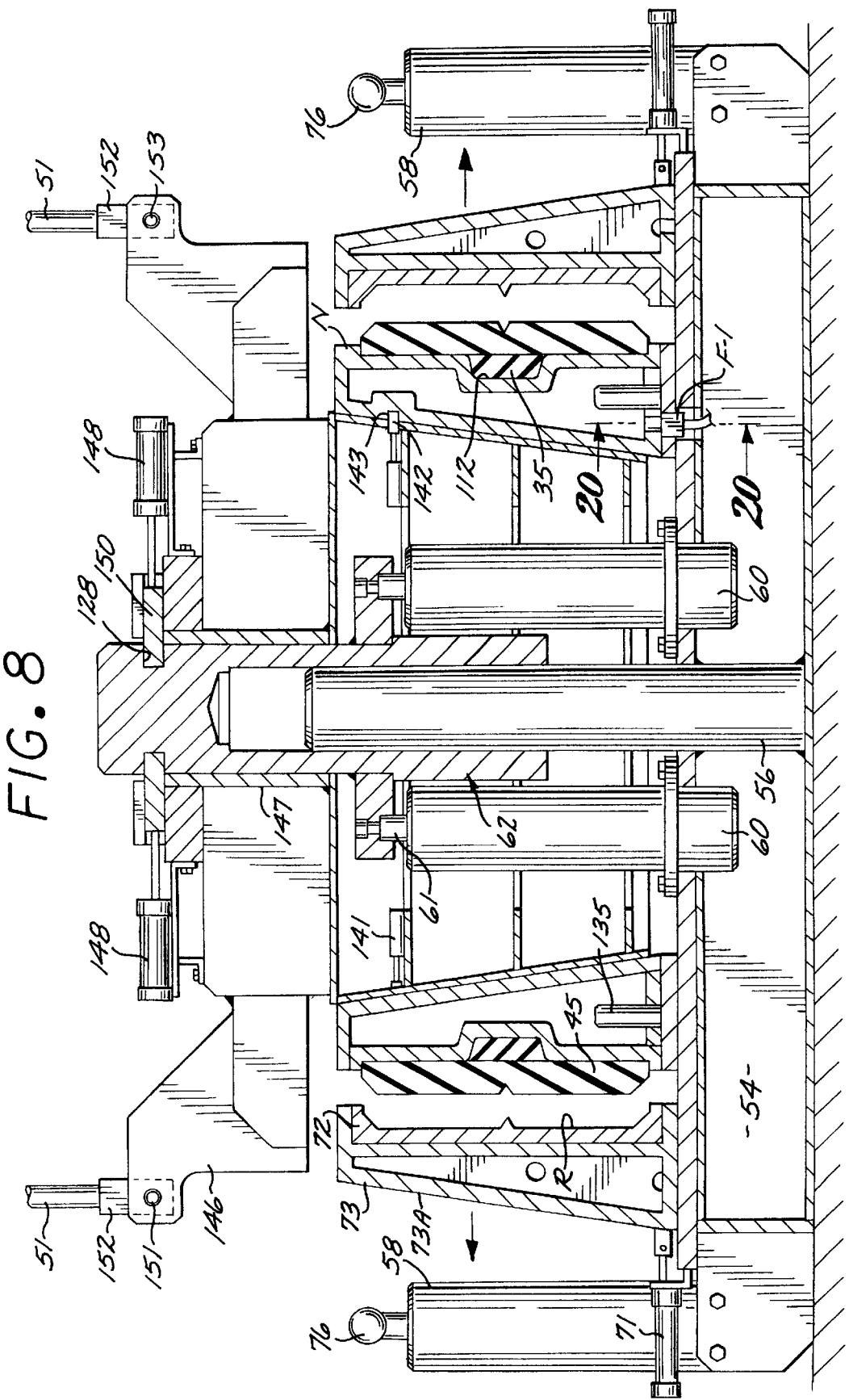
FIG. 8 is a cross-sectional side view showing the segment handler, inner segments and rubber track disposed within the molding press.
Figure 9:
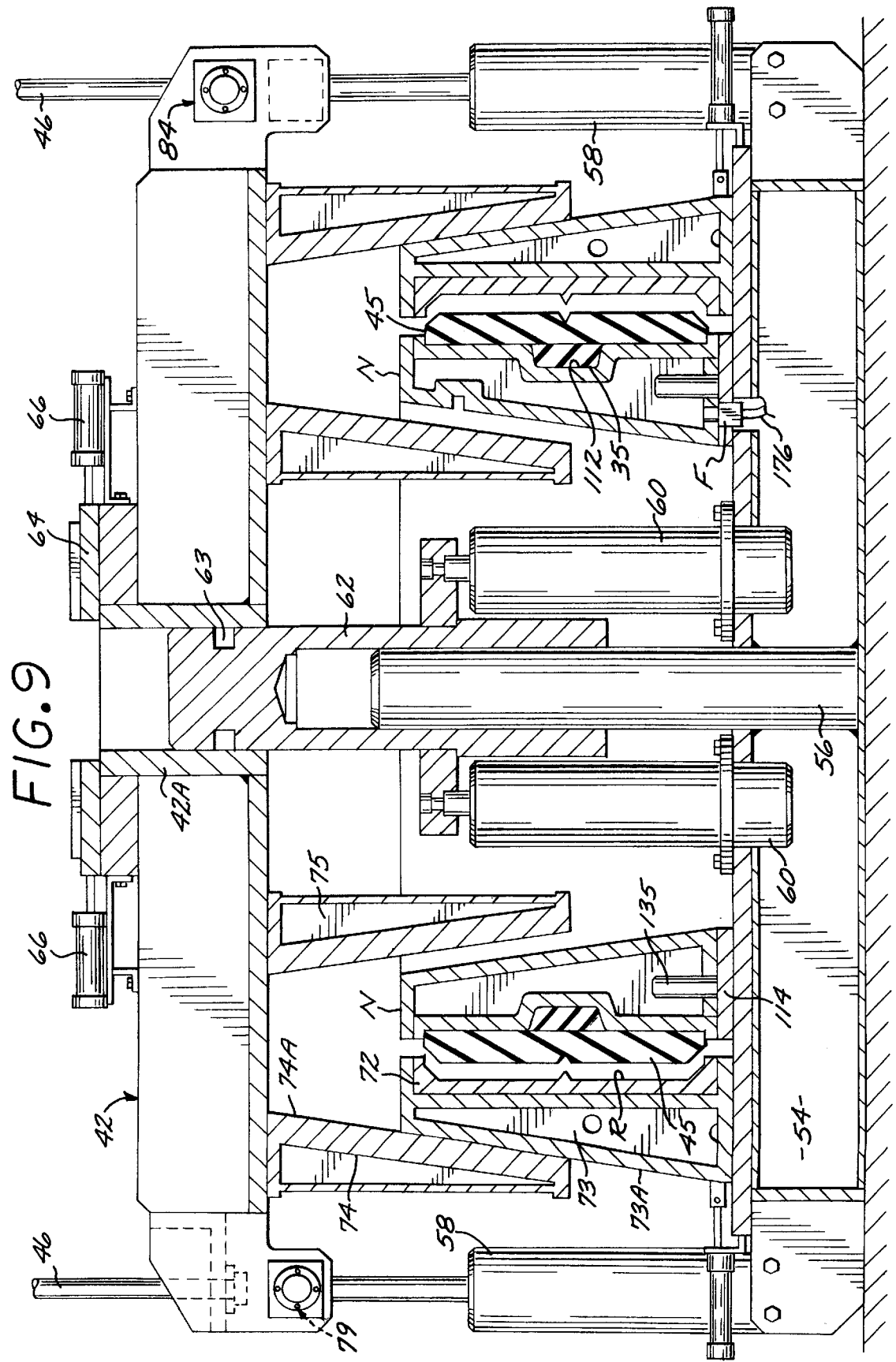
FIG. 9 is a cross-sectional side view showing the molding press top being lowered into the molding press lower platen.

Referring to FIGS. 4, 4A, 8, 9 and 10, lower platen 40 is disposed within a depression formed in floor C and includes a base 54 from the center of which extends a guide post 56. A plurality of like, outer hydraulic cylinder and plunger closing units 58 extend upwardly from the sides of the lower platen 40. The inner portion of lower platen base 54 supports inner hydraulic cylinder and plunger units 60. The molding press top 42 is lifted onto and off of the lower platen by the vertically reciprocal lifting screw rods 46 of gantry MG (FIG. 9). The upper portion of the plungers 61 of the inner cylinder plunger units 60 are affixed to a guide member generally designated 62, the upper portion of which is formed with a recess 63 selectively locked to the upper portion of press top 42 by horizontally movable U-shaped locking plates 64 operated by horizontally disposed fluid actuated cylinder and plunger units 66. A second plurality of horizontally extending fluid actuated cylinder and plunger units 71 are secured to the lower platen 40 to effect horizontal movement of a plurality of molding press segments 72 which are secured to heat-transfer hollow cones 73 relative to the floor of the lower platen. A plurality of hollow backing cones 74 and inner backing cones 74A depend from the underside of press top 42 (FIG. 9). The surface of molding press segments are formed with recesses R which form the treads 31 of the completed tractor track T.

Figure 4:
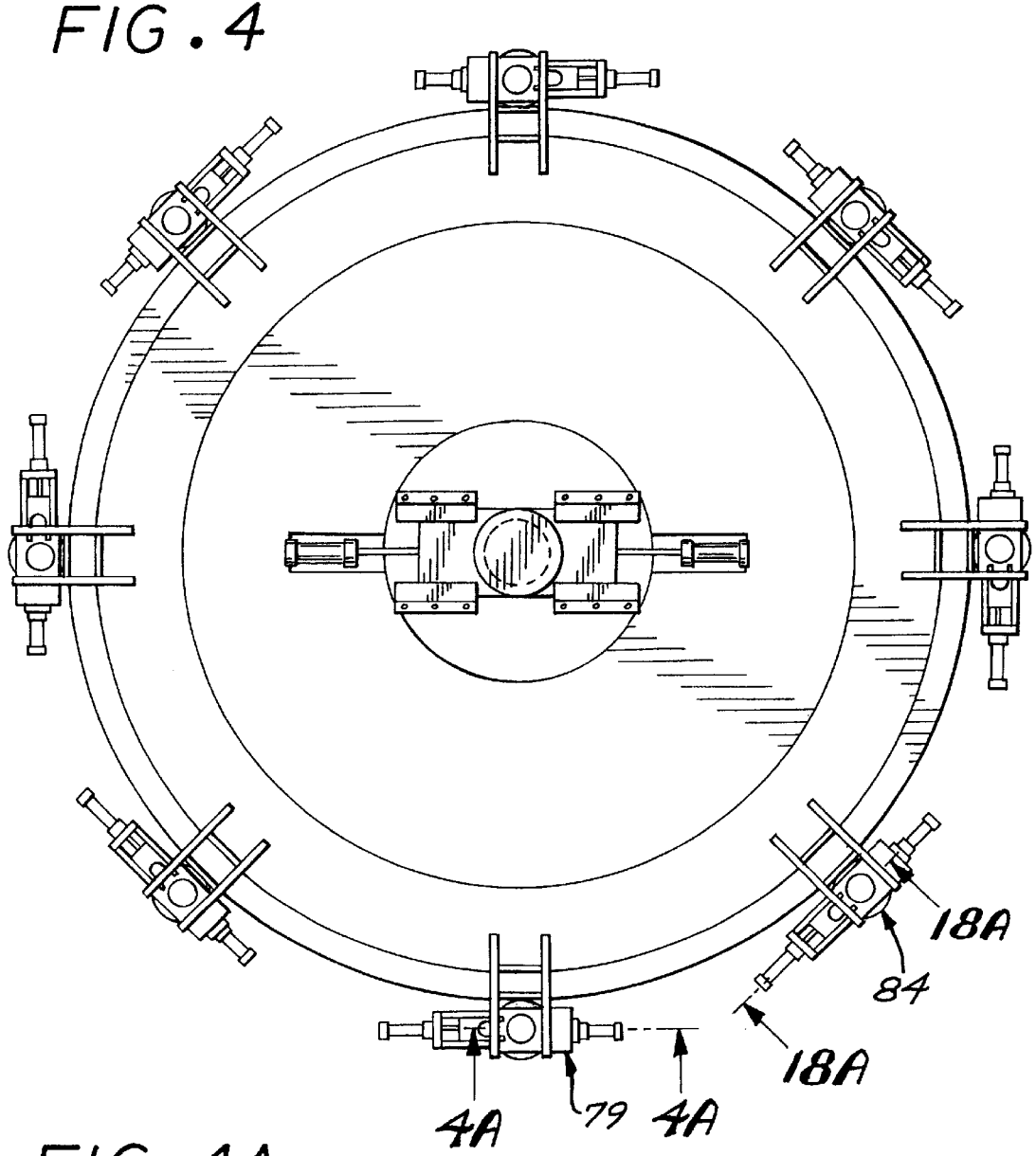
FIG. 4 is a top plan view of a molding press forming part of the above said apparatus.

Molding press top 42 includes a sleeve 75 which slidably receives the upper portion of guide member 62 to centrally align the top molding press member and the lower platen. Referring to FIG. 4-A, the upper ends of the plungers of the closing cylinder and plunger units 58 are formed with knobs 76 which are releasable locked within complementary sockets 78 formed in blocks 78A supported on the outer periphery of mold top 42. A plurality of fluid-operated locks 79 arranged around the periphery of the mold top each includes a conventional fluid-actuated cylinder 80 that moves a U-shaped horizontal plate 81 towards and away from the underside of the knobs 76 to connect and disconnect the cylinder and plunger units 58 to the mold top 42.

Referring to FIGS. 4, 9, 18A and 18B, a plurality of fluid actuated locks 84 are attached to molding press top 42 above locks 79 to removably secure the lower ends of lifting screw rods 46 of molding press gantry MG to the molding press top. Locks 84 include U-shaped plates 86 that are extended over the lower end of screw rods 46 to engage an enlargement 46A formed on the lower end of the lifting screw rods 46 by means of conventional fluid-actuated horizontal cylinder and plunger units 87.

Referring now to FIGS. 1, 2, 5 and 6, the belt handlers BH-1 and BH-2 are of like construction, and include four vertical retractable fingers 90 horizontally slidably carried by horizontal X-shaped carrier 92, while the upper end of each retractable finger 90 is horizontally slidably supported on one leg of the carrier. Movement of the fingers 90 is effected by conventional fluid-actuated cylinder and plunger units 94 (FIG. 6). A lifting screw rod 96 is rigidly secured to the center of carrier 92. The upper end of lifting screw 96 is threadably connected to a electric motor-driven nut member 101 (FIG. 2) secured to the free end of the boom of a power crane 102 that supports the belt handler BH-1 whereby rotation of the nut member effects vertical reciprocation of the lifting screw rod 96. The outer surface of each of the fingers 90 is formed with a drive lug cavity 104. The lower end of each finger is formed with a lip 106 that engages and supports the lower end of an uncured belt 45.

Referring to FIGS. 5, 6 and 11–17, segment loader SL includes a circumferentially arranged plurality of truncated frusto-conical hollow narrow segments N and wide segments W. Each segment has an upwardly and outwardly sloping inner surface and a vertically extending outer surface. The segments are formed of a metal having a high coefficient of thermal expansion such as aluminum. The mid-portion of the outer surface of each segment is formed with a drive lug cavity 112 which removable receives a drive lug 35. The bottom of each narrow segment N removably rests upon a shoe 114 having a bracket that extends through an opening 115 in the floor 116 of base 120 of the segment loader. The lower portion of each shoe bracket is secured to the plunger of a conventional fluid-actuated horizontally extending cylinder and plunger unit 122 having its outer end affixed to the inner periphery of the base 120. The mid-portion of floor 116 of base 120 is affixed to the cylinder of a vertically extending fluid-actuated cylinder and plunger unit 124. The plunger element of such unit is affixed to cylindrical lock element 126 formed with an annular groove 128. The wide segments W that removably hold an uncured drive lug 34 are similar in construction to the narrow segments and each rest removably upon a shoe having a bracket that extends through floor opening (not shown). A threaded socket 135 is secured to the shoes 114. A tie bolt 135a extends through segments N to temporarily attach the segments to the shoes. Wide segments W are provided with a similar attachment arrangement.

Referring to FIG. 7, the segment handler SH includes a downwardly tapering frusto-conical barrel 140, the angularity of which is complimentary to the angularity of the inner surfaces of the segments N and W of the segment loader SL. The interior of barrel 140 is provided with a plurality of conventional, horizontally extending fluid actuated cylinder and plunger units 141, the plungers of which are secured to pins 142 which are removably engageable with complimentary sockets 143 formed in the inner walls of the inner and wide segments of the segment loader SL.

The upper end of barrel 140 is rigidly attached to a horizontal lifting arm 146 centrally formed with a vertical cylinder 147 which is slidably engageable with the cylindrical lock element 126 of the segment loader SL. The mid-portion of lifting arm 146 carries a pair of conventional fluid-actuated cylinder and plunger units 148 which effect horizontal movement of a pair of U-shaped locking plates 150 engageable with the groove 128 of lock element 126. The outer ends of each lifting arm 146 is formed with bores 151 aligned with a bore 152 formed in a blocked carried by the lower ends of the lifting screw rods 51 of segment gantry SG. The lower end of each lifting screw rod 51 is releasably secured to the lifting arms 146 by a pin 153 attached to a fluid-actuated cylinder 153A carried by the outer ends of the lifting arms (FIG. 18C).

In the operation of the aforedescribed apparatus, a plurality of uncured belts 45 are disposed upon the conveyor belt 44. As an uncured belt approaches the molding apparatus, fingers 90 of belt handler BH-1 are retracted and the belt handler is lowered into an uncured belt. The four fingers 90 are then extended into engagement with the interior of the belt 45 and the belt is transferred from the conveyor belt to a position above the segment loader SL, as shown in FIGS. 1 and 5 by power crane 102. Next, the belt is lowered into segment handler SH and the fingers N of the segment loader are extended into engagement with the inner surface of belt 45. The movable fingers 90 of the belt handler are then retracted by means of fluid actuated cylinder and plunger units 96 and the belt handler BH-1 is then lifted out of the segment handler. The segments W are then also advanced into contact with the belt.

Referring now to FIG. 7, outward movement of the segments N and W of the segment loader SL by cylinder and plunger units 122 and 133 forces the outer surfaces of the uncured drive lugs 35 very tightly against the inner periphery of the uncured belt 45. This operation can occur at room temperature or below 100° F. In this manner, the drive lugs are securely attached to the inner periphery of the uncured belt. If desired, an adhesive may be interposed between the drive lugs and the belt. Thereafter, the segment handler SH is lowered into the segment loader by segment gantry SG and the plunger of fluid-actuated cylinder unit 124 pulls the segment handler SH downwardly to firmly seat the segment handler within segments N and W (FIG. 7). The drum 140 of the segment handler SH is engaged with the inner and outer sockets 142 of the segment handler SH by means of the fluid actuated cylinder and plunger units 141. The segments N and W may then be lifted off of the floor 116 of the segment loader and horizontally transferred to a position over the lower platen 40 of molding press M by the segment gantry SG. Segments N and W are then lowered into the lower platen and the segments N and W are disengaged from the segment handler by removing tie rods 135 A (FIG. 8). The segment handler is returned to its table 160 by the segment gantry.

Figure 4A:
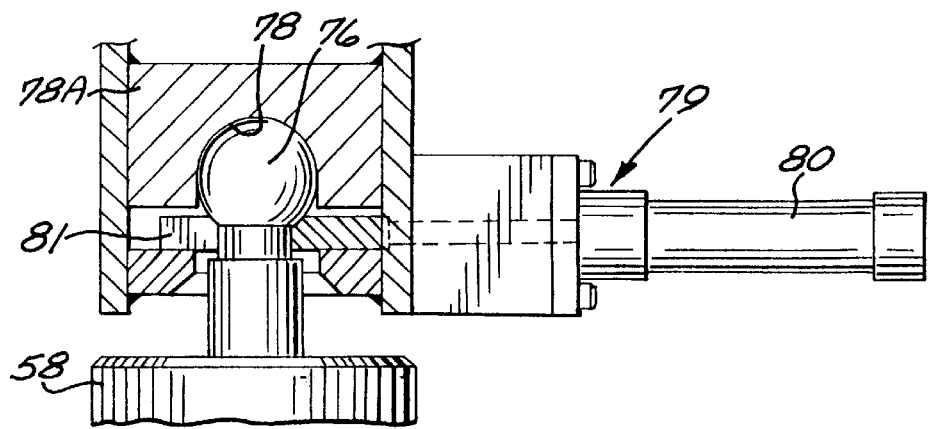
FIG. 4A is a broken vertical sectional view taken in enlarged scale along line 4A—4A of FIG. 4.
Figure 10:
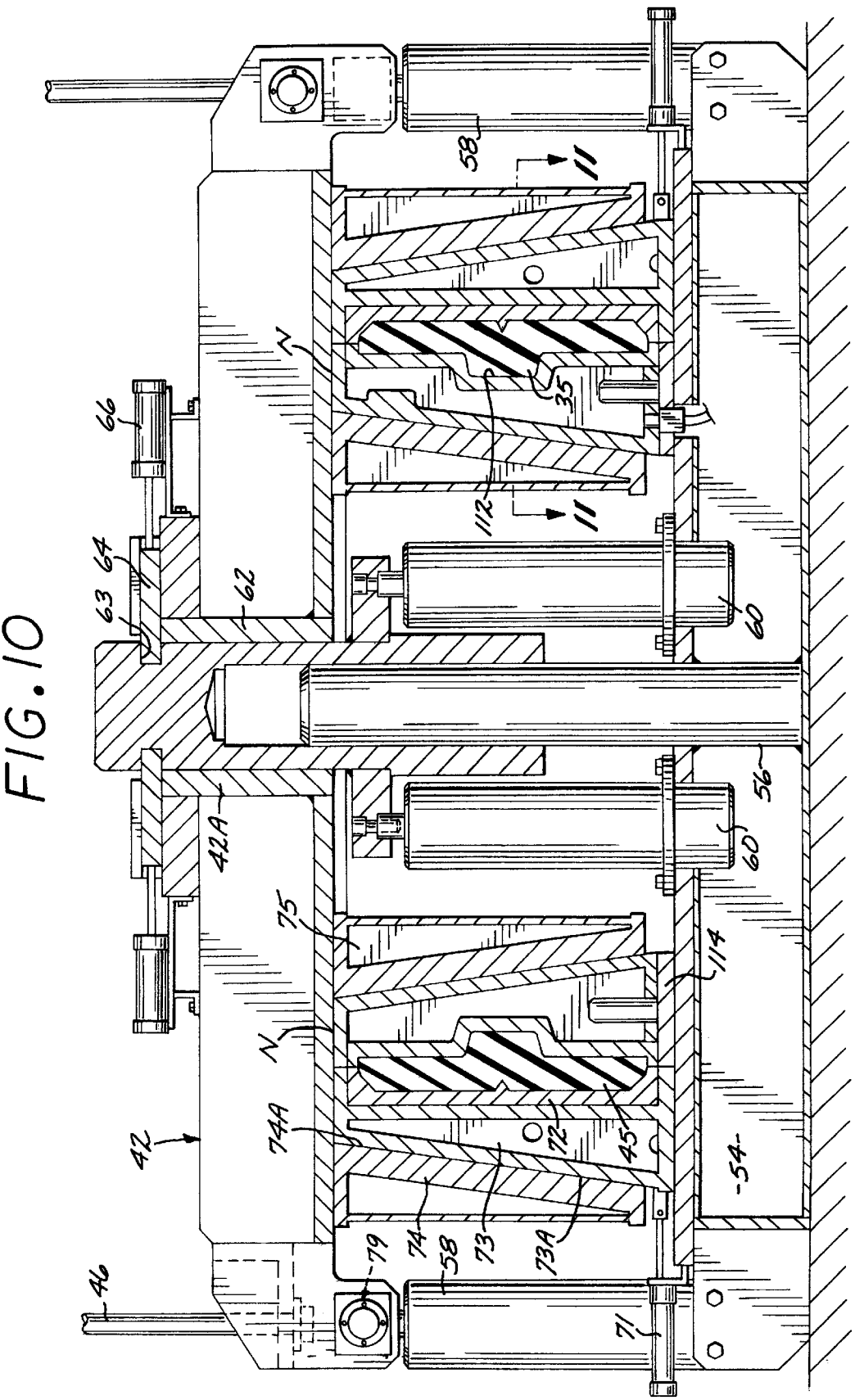
FIG. 10 is a cross-sectional side view showing the molding press top lowered into a molding position.

Next, the molding press gantry MG will horizontally move the mold press top 42 to a position coaxial with the lower platen 40, and the lifting screws 46 of the mold press gantry MG lower the molding press top downwardly toward the lower platen 40 until the sockets 78 encompass knobs 76 of the cylinder and plunger units 58 (FIG. 9). The U-shaped plates 81 are then advanced into a locked position below the knobs (FIG. 4A). The lifting screw rods 46 are disconnected from the molding press gantry by locks 79. The inner hydraulic cylinder and plunger units 60 will raise guide member 62 from its position of FIG. 9 to that of FIG. 10, and fluid actuated hydraulic cylinder and plunger units 66 will advance the locking plates 64 into the recess 63 of the guide member 62 and cylinder and plunger units (FIG. 10). The inner cylinder and plunger units 60 in combination with the outer cylinder and plunger units 58 now urge mold top 42 tightly into the lower platen 40 to close the molding press.

Figure 11:
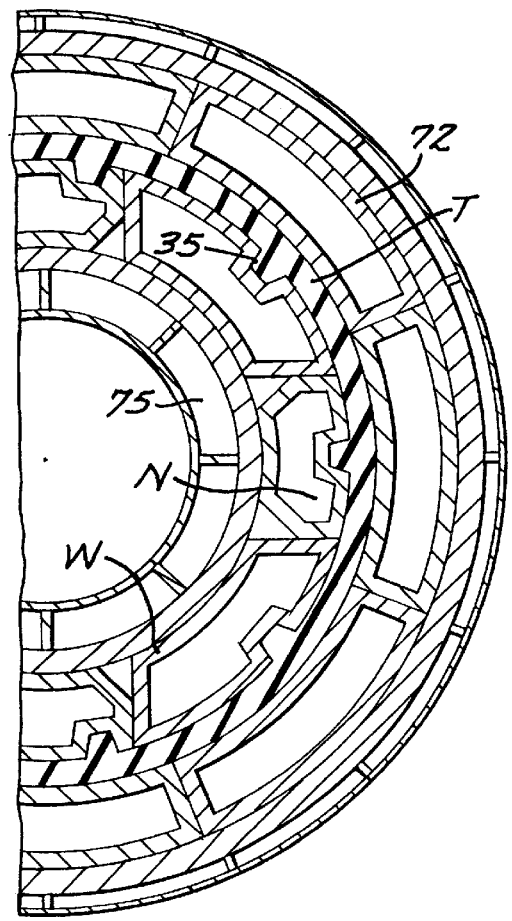
FIG. 11 is a broken horizontal sectional view taken in enlarged scale along lines 11—11 of FIG. 10 during a rubber tractor track molding operation.
Figure 12:
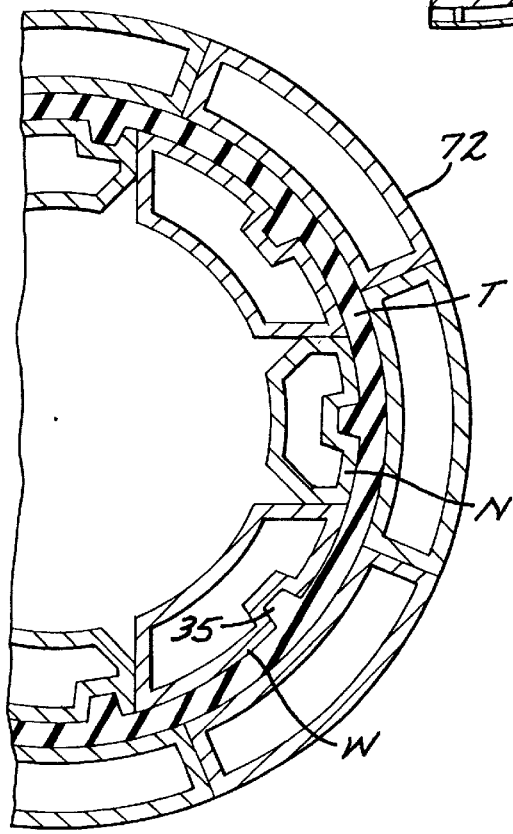
FIGS. 12–17 show the parts of FIG. 11 as they are disposed during and after a rubber tractor track molding operation.
Figure 13:
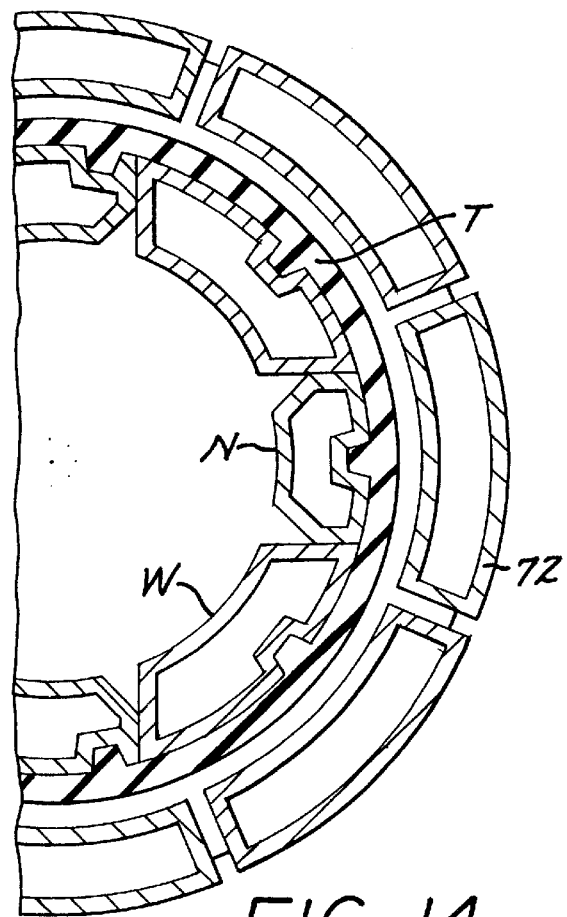

It should be noted that once the molding press is closed, the segments N and W are at about room temperature although the molding press segments 72 are heated. Accordingly, segments N and W provide adequate clearance (1/8"–1/4") to admit the uncured belt 45 and drive lugs 35. Cylinder and plunger units 71 advance the outer mold segments into contact with the outer belt surface. Previously, the cones 73 and hence outer molding press segments 72 will have been heated by steam or hot water to a desired temperature, and will remain heated during subsequent belt curing operations. The narrow and wide inner segments N and W will then be heated by steam through special fittings shown in FIGS. 19 and 20, described hereinafter so as to apply compressive force between the outer molding press inner segments 72 and the segments N and W, since the heated segments expand towards one another. The inner and outer backing cones 74 and 74A of the mold top restrain the inner and outer segments against outward movement (FIG. 10). Thermal expansion of the aluminum segments towards one another compresses and cures the belt 45 while forming treads in the outer periphery thereof. At the same time, the drive lugs 35 are cured and integrally bonded to the inside periphery of the belt (FIG. 11). After the molding step, the guide member 62 is unlocked from the mold top and the molding press gantry lifting rods 46 are locked to the mold top. The mold top 42 is then lifted upwardly out of the lower platen 40 by both the outer cylinder and plunger units 58 and inner cylinders and plunger units 60. Then mold gantry MG returns the mold top to its original position of FIG. 1. Next, the molding press segments 72 are retracted (FIG. 13). The cured belt T is in tight contact with the inner segments N and W at this time.

Figure 14:
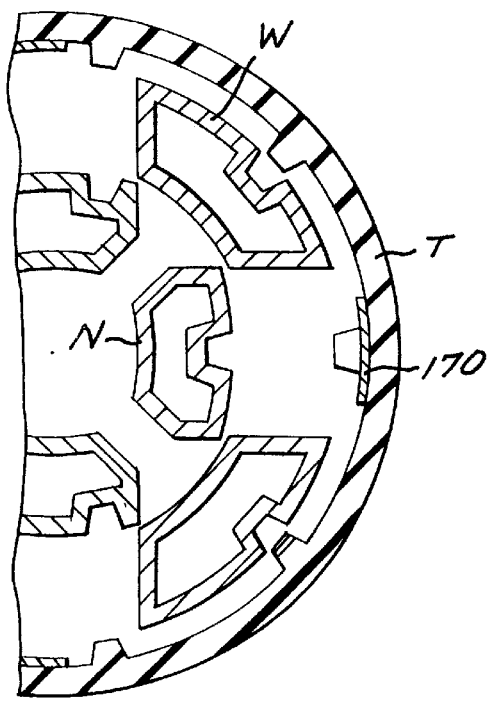
Figure 15:
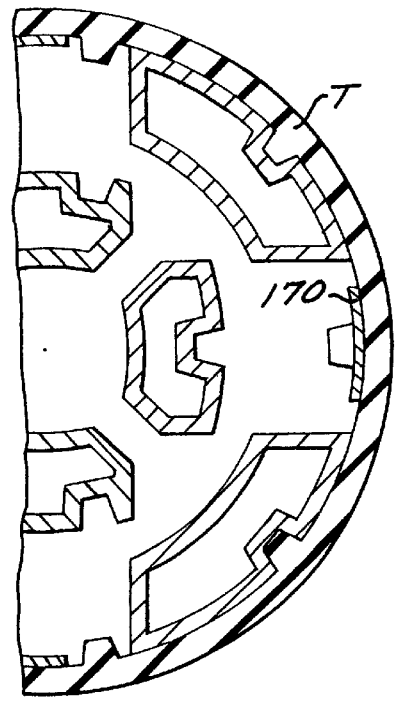

The segment handler SH is then moved back into the lower platen 40 and transfers the segments N and W with the cured belt into the segment loader SL by segment gantry SG. Cool water is then forced into one or more of the segments N and W by fittings of the type shown in FIGS. 19 and 20 so as to cause such segments to shrink away from the belt's inner periphery. The narrow segments are then retracted by cylinder and plunger units 122 until there is sufficient clearance for the belt handler BH-2 fingers 170 to engage the cured belt T (FIG. 14). Wide segments W are then retracted, as indicted in FIGS. 14 and 15, so as to free the cured track T. Belt handler BH-2 is then actuated to remove the cured belt T from the segment loader SL onto conveyer belt 44.

Since the segments N and W are fabricated from a metal having a high coefficient of thermal expansion, such as aluminum, such segments will move radially inwardly away from the cured track when cooled water is forced into such segments due to thermal contraction.

Figure 17:
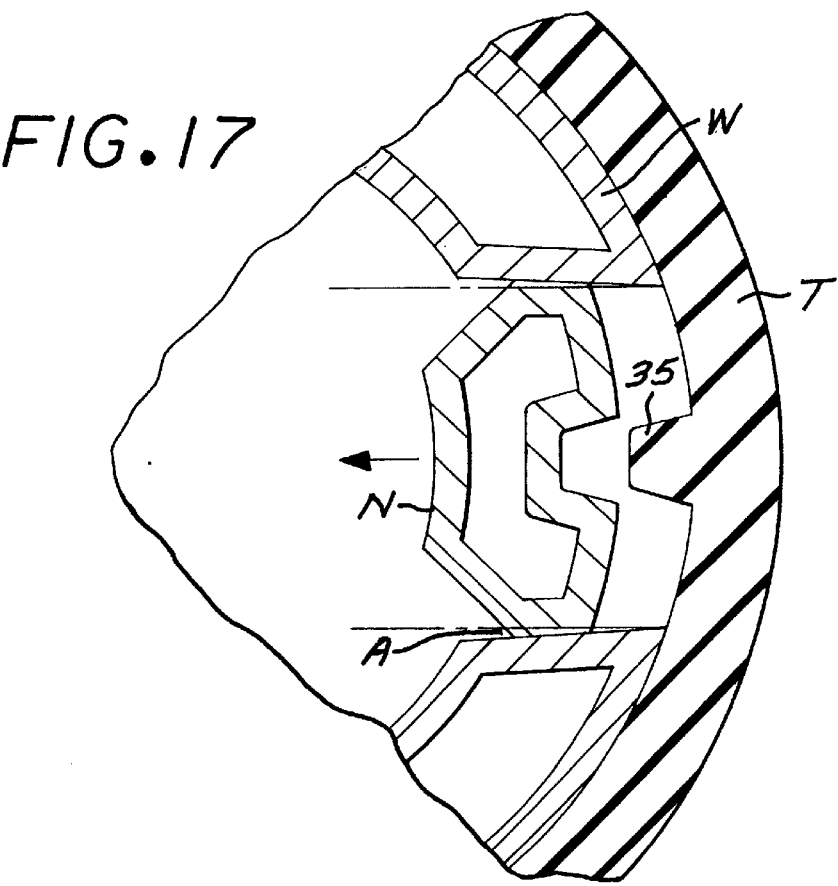
Figure 16:
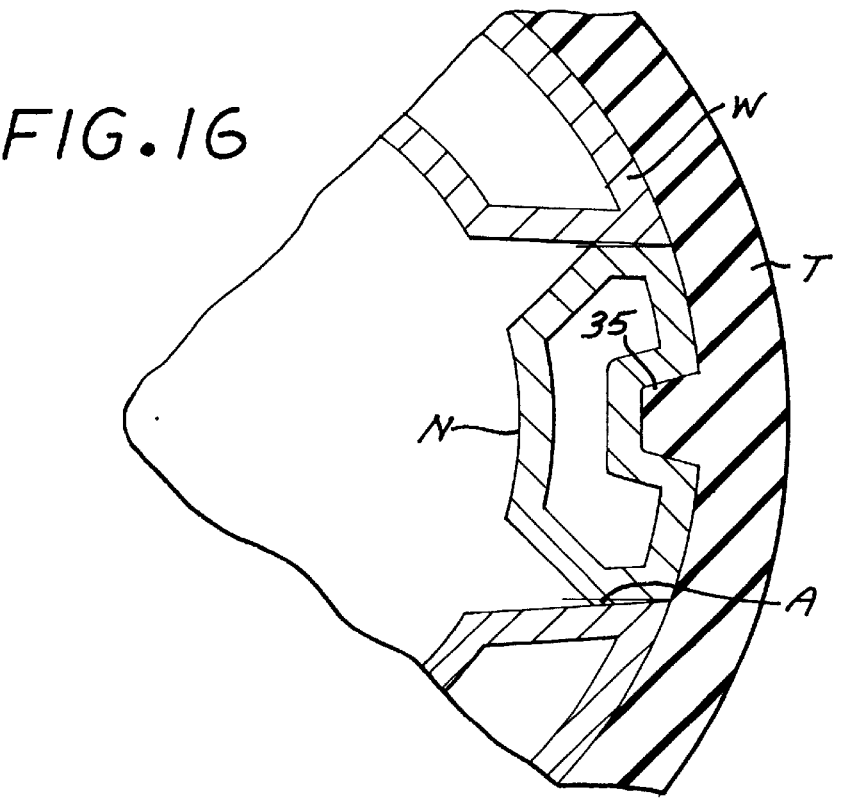

Referring to FIGS. 16 and 17, it will be noted the facing surfaces 172 and 174 of the narrow and wide segments N and W taper radially inwardly and outwardly at an angle A. With this arrangement, extension of the narrow segments N will urge the wide segments W tightly into a complete circle when the segments contact the inner periphery of an uncured belt. When a cured belt is to be removed from the segment assembly, such taper assists in retraction of the narrow segments.

Referring now to FIGS. 9, 10, 19 and 20, steam is admitted to the removable segments N and W by the fitting F shown in FIGS. 19 and 20. Fitting F includes a pipe 176 attached to a boss 178 that is threaded to the floor of the mold bottom 40. Boss 178 has a cavity 180 wherein is slidably disposed a sleeve 182. Sleeve 182 is biased upwardly by a coil spring 184 relative to cavity 180. An O-ring is carried by the upper end of sleeve 182. Stop screws 185 limit upward movement of sleeve 182. When segment W is lowered onto the floor of mold bottom 40, sleeve 182 will be pushed downwardly into cavity 180 and steam can flow through pipe 176 into the segments. Referring to FIGS. 6 and 7, a similar fitting F-3 is provided to admit cooled water into segments N and W when the temperature of such segments is to be reduced to permit a cured track T to be removed from the segment handler SH.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A method of making an endless tractor track having treads on its outer portion from an initially uncured belt and a plurality of drive lugs, such method including the steps of:
   providing a molding press having inner molding segments and outer molding segments that are initially separated from one another;
   securably attaching the drive lugs onto the inner periphery of the uncured belt;
   positioning the uncured belt with the drive lugs attached thereto between the inner and outer molding segments;
   heating the molding press and moving the inner and outer molding segments together to exert compressive pressure on the uncured belt and drive lugs to mold treads on the outer portion of the belt while bonding the drive lugs to the inner periphery of the belt to form an endless tractor track;
   separating the inner and outer molding segments; and
   removing the cured tractor track from the molding press.

2. A method as set forth in claim 1, wherein the drive lugs are attached to the inner periphery of the uncured belt by pressing the drive lugs against the inner surface of the uncured belt.

3. A method of making an endless tractor track having treads on its outer portion from an initially uncured rubber belt and a plurality of drive lugs, such method including the steps of:
   providing outer molding segments having recesses to form treads on the outer portion of the belt;
   providing inner molding segments having drive lug cavities on their radially outer sides;
   releasably disposing drive lugs within such cavities;
   advancing the inner molding segments against the inner periphery of the uncured belt to securely attach the drive lugs to the inner periphery of the uncured belt;
   positioning the outer molding segments coaxially outwardly of the inner molding segments and the uncured belt with the drive lugs attached thereto;
   heating the outer and inner molding segments while exerting compressive pressure on the outer and inner molding segments to mold treads on the outer portion of the belt and cure the belt while bonding the drive lugs to the inner periphery of the belt to form the endless tractor track; and
   removing the completed tractor track from between the molding segments.

4. A method as set forth in claim 3 which further includes cooling the inner molding segments to thereby retract such inner molding segments away from the belt before the completed track is removed from between the molding segments.

5. A method as set forth in claim 4 wherein the molding segments are formed of aluminum.

6. A method of molding an endless tractor track having treads on its outer portion from an initially uncured rubber belt and a plurality of drive lugs, such method including the steps of:
   providing a molding press which has outer molding segments that include recesses to form treads on the outer portion of the belt, said molding press also including inner molding segments having drive lug cavities on their outer sides;
   releasably positioning drive lugs in the lug cavities;
   expanding the inner molding segments into engagement with the inner periphery of the uncured belt to attach the drive lugs to such inner periphery;
   moving the inner molding segments and uncured belt with the drive lugs attached thereto into the confines of the outer molding segments;
   advancing the outer molding segments into contact with the outer surface of the belt while restraining the inner and outer molding segments against movement away from one another;
   heating the inner and outer molding segments to cure the belt while forming treads on the outer portion of the belt and bonding the drive lugs onto the inner periphery of the belt;

retracting the outer molding segments away from the belt;
withdrawing the inner molding segments and cured belt from the molding press;
retracting the inner molding segments away from the cured belt; and
removing the completed track from molding press.

7. A method as set forth in claim 6 wherein the inner molding segments are cooled before being retracted away from the cured belt.

8. A method as set forth in claim 6 wherein one of the inner molding segments is retracted before the other inner molding segments are retracted.

9. A method as set forth in claim 6 wherein the molding segments are formed of aluminum.

10. A method as set forth in claim 9 wherein one of the inner molding segments is retracted before the other inner molding segments are retracted.

11. Apparatus for molding an endless tractor track having treads on its outer portion from an uncured rubber belt and a plurality of drive lugs, said apparatus comprising:

a molding press having a plurality of horizontally movable outer molding segments formed with tread-defining recesses on their inner portions, said molding press also having a plurality of inner molding segments;

a segment loader that initially supports said inner molding segments for horizontal movement, each molding segment having a drive lug cavity that initially removably holds a drive lug;

a belt handler for coaxially positioning an uncured belt outwardly of the inner molding segments while said segments are supported by the segment loader;

power-operated means on the segment loader to urge the inner molding segments outwardly to secure the drive lugs against the inner periphery of the uncured belt;

a segment handler for moving the inner molding segments and uncured belt with the drive lugs attached thereto out of the segment loader into the space encompassed by the outer molding segments;

power-operated means on the molding press for advancing the outer molding segments against the outer surface of the uncured belt as said belt is supported on the inner molding segments;

backing means to restrain the inner and outer molding segments against separating; and heating means on the molding press to effect curing of the belt between the inner and outer molding segments while forming the treads on the outer surface of the belt and bonding the drive lugs onto the inner portion of the belt.

12. Apparatus as set forth in claim 11 which further includes means for cooling the inner molding segments before the inner molding segments are retracted to free the cured belt.

13. Apparatus as set forth in claim 11 wherein the belt handler includes a plurality of vertical fingers that are selectively retractable whereby the plurality of fingers removably engage the inner periphery of the belt to effect movement thereof relative to the segment loader.

14. Apparatus as set forth in claim 11 wherein one of the inner molding segments is retracted before the other inner molding segments are retracted.

15. Apparatus for molding an endless tractor track having treads on its outer portion from an uncured rubber belt and a plurality of drive lugs, said apparatus comprising:

a molding press having a plurality of horizontally movable outer molding segments formed with tread-defining recesses on their inner portions, and also having a plurality of inner molding segments;

a segment loader having a floor that initially removably supports said inner molding segments, power-operated means to effect horizontal movement of the inner molding segments, and fastening means that selectively lock the inner molding segments against upward movement away from said floor, with the inner molding segments being formed with outwardly facing drive lug cavities, each initially removably containing a drive lug;

a belt handler that positions an uncured belt in encompassing relationship with the inner molding segments disposed upon the segment loader, whereafter said power-operated means urges said inner molding segments outwardly to secure the drive lugs upon the inner periphery of the uncured belt; and a segment handler for moving the inner molding segments and uncured belt with the drive lugs attached thereto into the molding press space to thereby be encompassed by the outer molding segments after the fastening means have unlocked the inner molding segments from said floor whereafter, the belt is heated to cure such belt while forming the treads on the outer surface of the belt and bonding the drive lugs onto the inner portion of the belt, with the segment handler thereafter withdrawing the inner segments and cured belt from the molding press whereby the inner segments can be retracted to free the cured belt by said power-operated means.

16. Apparatus as set forth in claim 15 wherein one of the inner molding segments is retracted before the other molding segments are retracted.

17. Apparatus as set forth in claim 15 wherein the belt handler includes a plurality of vertical fingers, that are selectively retractable whereby the plurality of fingers can removably engage the inner periphery of the belt to effect movement thereof relative to the segment loader.

* * * * *